United States Patent [19]
Pasini et al.

[11] 4,188,139
[45] Feb. 12, 1980

[54] METHOD AND APPARATUS FOR CORRECTABLY PRINTING CHARACTERS WITH SUBLIMABLE INK

[75] Inventors: Arnaldo Pasini; Claudio Dalmasso; Riccardo Brescia, all of Ivera; Roberto Bosio, Cascinette d'Ivera, all of Italy

[73] Assignee: Ing. C. Olivetti & C., S.p.A., Italy

[21] Appl. No.: 794,514

[22] Filed: May 6, 1977

[30] Foreign Application Priority Data
May 10, 1976 [IT] Italy ................ 68142 A/76

[51] Int. Cl.² .......................................... B41J 29/16
[52] U.S. Cl. ............................. 400/696; 400/237; 106/22; 106/32; 400/120
[58] Field of Search ............... 197/1 R, 53, 54, 150, 197/172, 181; 106/20, 21, 22, 23, 24, 25, 26, 27, 28, 29, 30, 31, 32, 32.5

[56] References Cited
U.S. PATENT DOCUMENTS

| | | | |
|---|---|---|---|
| 2,755,202 | 7/1956 | Balon et al. | 197/172 X |
| 2,950,256 | 8/1960 | Mazer et al. | 106/32 UX |
| 3,237,748 | 3/1966 | Rifkin | 197/181 |
| 3,414,417 | 12/1968 | Miller et al. | 106/32 X |
| 3,464,534 | 9/1969 | Muncheryan | 197/181 |
| 3,519,456 | 7/1970 | Reed et al. | 197/172 UX |
| 3,553,421 | 1/1971 | Schawlow | 197/181 UX |
| 3,741,995 | 6/1973 | Pugin et al. | 106/22 X |
| 3,781,279 | 12/1973 | Crounse et al. | 106/22 X |
| 3,786,907 | 1/1974 | Muncheryan | 197/181 |
| 3,799,316 | 3/1974 | Davidge et al. | 197/181 |
| 3,831,727 | 8/1974 | Kruspe et al. | 197/1 R |
| 3,989,131 | 11/1976 | Knirsch et al. | 197/172 X |
| 4,003,459 | 1/1977 | Moffatt | 197/1 R |
| 4,042,545 | 8/1977 | Defago et al. | 106/32 X |
| 4,062,644 | 12/1977 | Sponaes et al. | 106/32 X |

FOREIGN PATENT DOCUMENTS 2427092 12/1975 Fed. Rep. of Germany ........... 197/181
964416 7/1964 United Kingdom .................... 197/172

OTHER PUBLICATIONS

IBM Technical disclosure bulletin, "Temperature compensation for ink rolls", Vichich, vol. 16, No. 3, Aug. 1973, p. 951.
IBM Technical disclosure bulletin, "Thermal Printer Ribbons", Crooks et al., vol. 18, No. 7 Dec. 1975, pp. 2267-2268.

*Primary Examiner*—Ernest T. Wright, Jr.
*Attorney, Agent, or Firm*—Schuyler, Birch, McKie and Beckett

[57] ABSTRACT

A correctable print is obtained by using an easily sublimable ink. Said print is completely erased when heated at a temperature insufficient to cause the darkening of the paper, by means of a hot point, of hot air, or of radiant energy.

17 Claims, 10 Drawing Figures

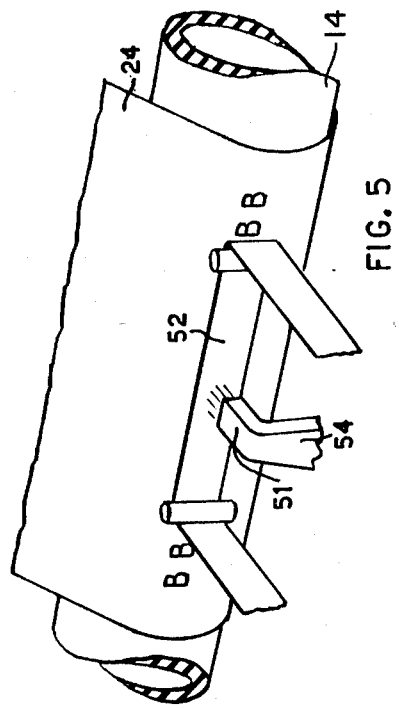
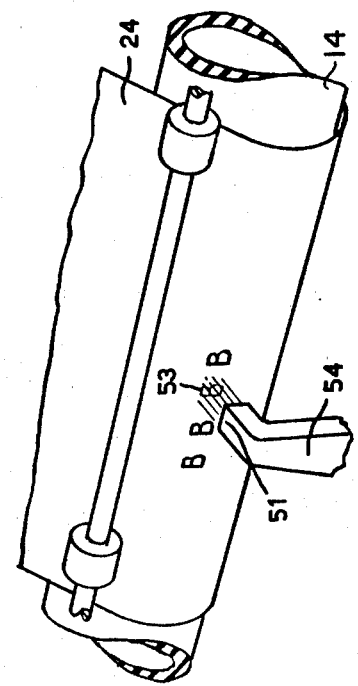
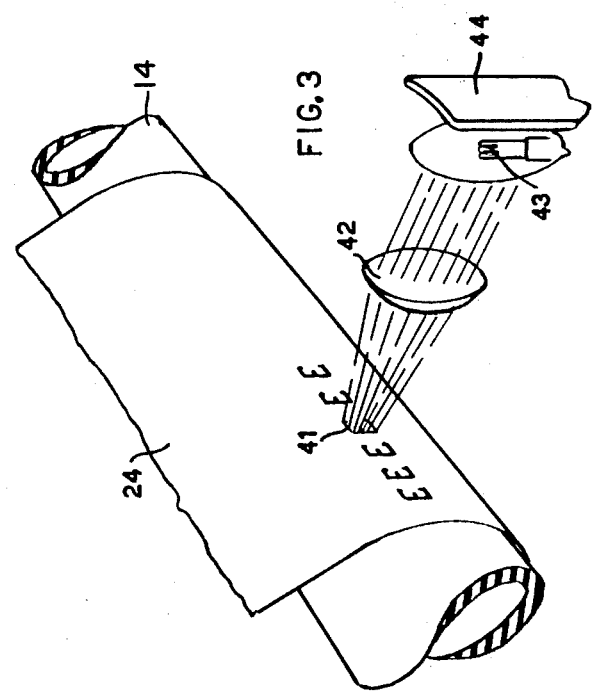

METHOD AND APPARATUS FOR CORRECTABLY PRINTING CHARACTERS WITH SUBLIMABLE INK

BACKGROUND OF THE INVENTION

The invention relates to a method and apparatus for printing characters which can be easily erased for correction purposes.

For all known printing systems, the need has long been felt for the possibility of erasing faulty printed characters. Such a need has not been satisfied completely up to now, when inks are used for printing. The mechanical removal of the ink from the paper by means of abrasive erasers and of discoloring chemicals give a far from perfect erasure while considerably damaging the paper.

Such inconvenients are only partly overcome by the so called lift off systems, that require a perfect match of the writing and erasing media, and by the cover up systems that leave very visible erasures and in any case present the problem of the unavoidable color differences between the white covering material and the paper.

There are known some systems where the printing can be erased by means of heating. In one known arrangement a laser beam is used to erase the characters to be deleted. With ordinary printing inks, this requires the use of a high power laser source. Apart from the cost of such an eraser, the temperatures required to cause the disappearance of the ink marks from the paper are such that they cause the burning or darkening of the paper.

SUMMARY OF THE INVENTION

The main object of the present invention is a printing method and apparatus allowing an easy and complete erasure of the printing errors.

According to this invention, it is now provided a method for correctably printing alphanumeric characters visible under ordinary light including the steps of printing the characters with an ink containing coloring agents sublimable at a temperature lower than the darkening temperature of the paper, and producing a local concentrated heating of the characters to be erased substantially at said lower temperature, without requiring expensive sources of radiant energy.

BRIEF DESCRIPTION OF THE DRAWING

This and further characteristics of the invention will become clear from the enclosed disclosure of some embodiments of the invention, made by way of example and not in a limiting sense, in connection with the accompanying drawing, where:

FIG. 3 shows another embodiment of the erasing means;

FIG. 4 shows another embodiment of the erasing means;

FIG. 5 is a variant of the embodiment of FIG. 4;

DESCRIPTION OF THE PREFERRED EMBODIMENT

The method for erasably printing characters is based on the use of a printing ink containing coloring agents that can be sublimated at low temperature, allowing the erasure of the printed characters by heating the printed paper sheet at a temperature lower than the burning or darkening temperature of the paper.

Figure 2:
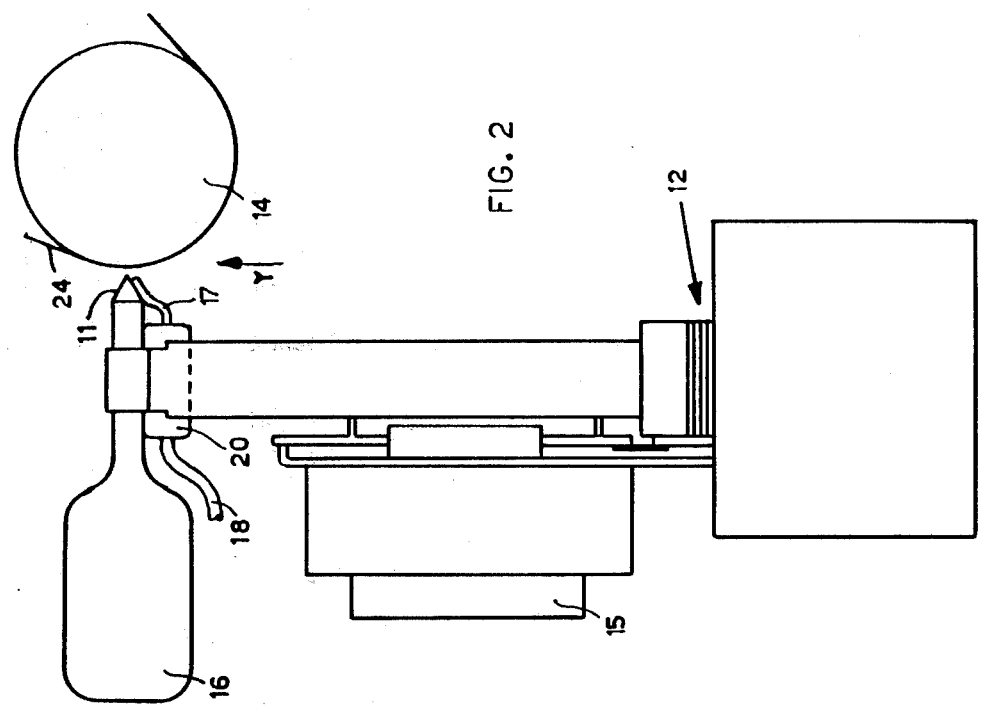
FIG. 2 is a lateral view of a detail of the printer of FIG. 1.
Figure 1:
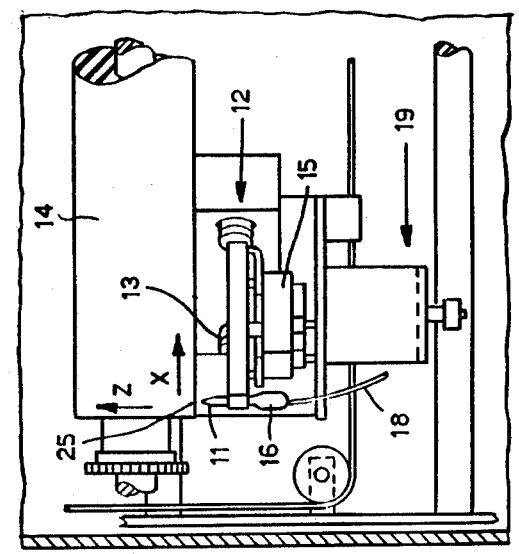
FIG. 1 shows a plane view of a printer according to the invention.

An example of a preferred embodiment of erasably printing characters is illustrated in FIGS. 1 and 2, wherein the characters are traced by a printing point 11, which is driven in the X and Y directions by two moving coil electromagnets 12 and 13, and pushed in the Z direction against the paper 24 inserted on platen 14 by a third electromagnet 15, in a known manner. The printing point 11 and the driving electromagnets 12, 13, 15 are carried by a carriage 19, which is transversely movable step by step in an advancing direction with respect to the paper platen 14. A back spacing mechanism not shown in also operable to back space the carriage 19 in a known manner.

In order to allow the erasure of the printed characters, the printing point 11 is a ball point pen supplied with a special ink containing sublimable agents contained in a pressurized reservoir 16. The preferred coloring agents suitable for the preparation of the ink belong to the class of anthraquinones; other suitable agents belong to the classes of azo, quinophtalone, azomethynes, stylbenes, nytrodiarylamines, acridines, xanthones, diazines. All these coloring agents have a temperature of sublimation, which is substantially lower than the temperature of darkening the paper 24.

To render the ink erasable, it is however necessary that it does not penetrate too deeply into the paper 24 during the writing, so that the heat can reach it easily and cause its sublimation. To this purpose it is convenient to use for the preparation of the ink solvents like water and organic solvents, as alcohols and glycols. The inks so obtained are very fluent, dry in a short time, and ensure a good writing with a constant color density.

The erasing characteristics can be increased by the use of additives with low sublimating temperature like lauric acid, camphor, naphtalene, that help to remove the coloring agent during the erasure of the printing.

In the example of FIGS. 1 and 2, secured to the printing point 11 closely below same, is a nozzle 17 terminating very close to it, but slightly retracted. The nozzle 17 can direct a stream of hot air onto the printing position 25 following the movement of the printing point 11 without actually touching the paper 24.

The nozzle 17 receives the air stream generated by a blower 34 (FIG. 6) through a flexible pipe 18, which can follow the movements of the carriage 19 (FIG. 1) carrying the printing point 11. The air is heated to a temperature of approximately 180° C. when passing in contact with heater 35 contained in a section 20 (FIG. 2) close to the extremity of the nozzle 17.

Figure 6:
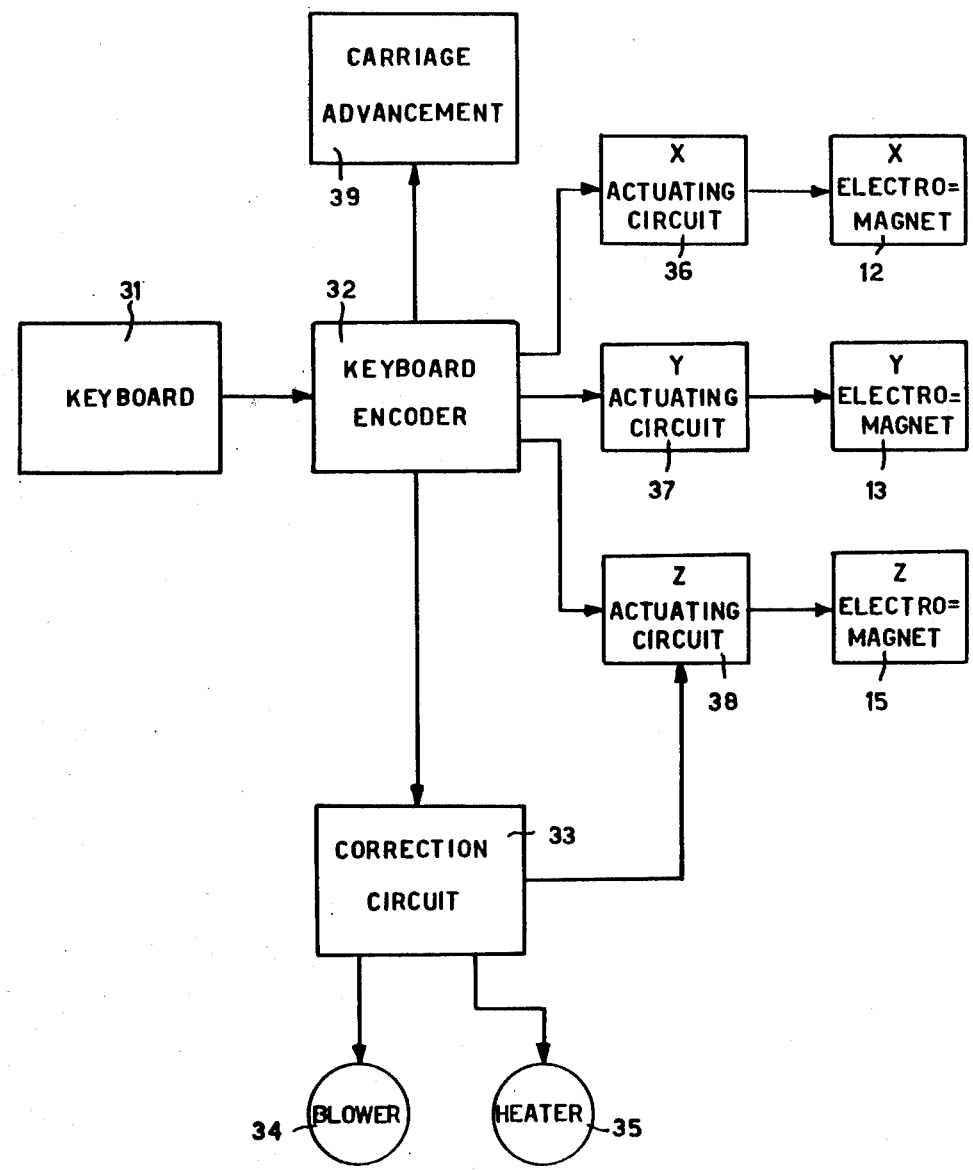
FIG. 6 is a block diagram of the embodiment of FIG. 1.

In the example the procedure for erasing a character is determined by the arrangement schematically indicated in FIG. 6, where 31 is a keyboard whose input is detected by a keyboard encoder 32 including a coding circuit whose outputs are connected to the X, Y, and Z actuating circuits 36, 37, 38 driving the X, Y and Z printing electromagnets 12, 13 and 15 that determine the printing of the character by the printing point 11, and to an actuating circuit 39 determining the movement of the carriage 19.

When a character has to be erased, the printing carriage 19 is positioned in the printing position 25 (FIG. 1) corresponding to the character to be erased, then a correcting key (not shown) of the keyboard 31 is depressed. Immediately thereafter the key of the character that has to be erased is depressed. The depression of the correcting key activates a correction circuit 33 which, in turn, activates the blower 34 feeding the flexible pipe 18 and the heater 35 contained in section 20 of FIG. 1, so feeding the nozzle 17 with hot air, and at the same time temporarily prevents the Z actuating circuit 38 from driving the Z electromagnet 15. In this way the printing point 11 is prevented from touching the paper 24, while a thin stream of hot air is precisely directed onto the character to be erased, following exactly the same path followed by the printing point 11 during the printing of the character and causing its complete disappearance. At the end of the erasure of the character, within the same time required for the printing of a character, the blower 34 and heater 35 are turned off. Because of the very short duration of the erasing operation, the hot air causes to appreciable darkening of the paper 24. A new character can now be printed without delay over the erased character.

In a known way the same correcting key can operate the back spacing mechanism to automatically return the last printed character on the printing position for erasure.

In a preferred embodiment the sublimable coloring agent is constituted by Resirenblau, produced by the firm Bayer, in normal use for the transfer printing of synthetic fabrics by means of sublimation procedures. To render it suitable for the use in the sublimable ink according to the invention, the coloring agent has been purified by means of sublimation.

The so purified agent has been finely ground adding percentages up to 25% of biners belonging to the classes of ethylcellulosic, ketonic, phenolic, acrylic resins intended to limit the penetration of the ink into the paper.
Example

| Ethyl alcohol | 100 | parts |
| --- | --- | --- |
| polyvinyl glycol 20 M | 2.75 | " |
| Resirenblau | 9.75 | " |
| Cellosolve | 100 | " |
| ethylcellulose | 8.8 | " |
| lauric acid | 26.6 | " |
| Resirenblau | 10.0 | " |
| Ethyl alcohol | 100 | " |
| water | 5 | " |
| polyvinyl glycol 20 M | 25.2 | " |
| Resirenblau | 0.19 | " |
| Cellosolve | 100 | " |
| ketonic resin | 8.5 | " |
| Resirenblau | 6.25 | " |

Other embodiments for the erasing means are illustrated in FIGS. 3, 4, 5 and 10. In FIG. 3 the heat required to cause the sublimation of the coloring agent of the printed character 41 to be erased is provided by a lamp 43 with a reflector 44, whose radiant energy is concentrated upon said character 41 by a lens 42. The lamp 43 is energized only when a character 41 has to be erased; being dark in color, the character 41 heats much more than the paper 24 on which it is printed, so favoring the sublimation of the coloring agent.

In the embodiment of FIG. 4 the erasing is operated by a hot air stream directed by the nozzle 51 of a pipe 54 onto the erasing position and covering the entire surface of the character 53 to be erased. In the variant to FIG. 5, an asbestos tape 52 is interposed between the nozzle 51 of the pipe 54 and the paper 24, in order to adsorb the sublimated color to prevent its condensation over the paper 24.

Figure 10:
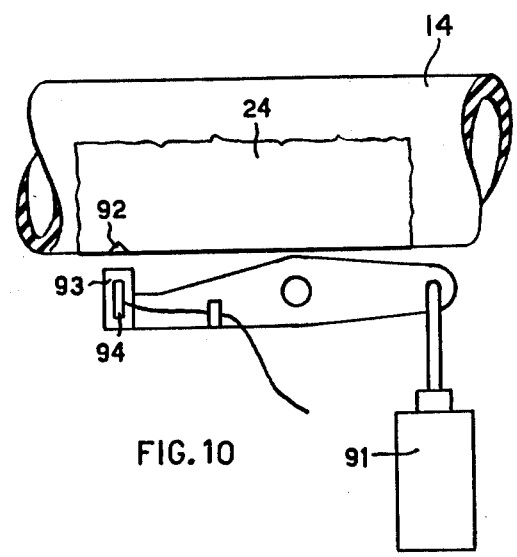
FIG. 10 shows another embodiment of the erasing means.

In the embodiment of FIG. 10, the erasure is accomplished by an electromagnet 91 that presses for a short time against the character 92 to be erased a metallic element 93, heated by a resistor 94, having a surface sufficient to completely cover the characters 92 to be erased.

Figure 7:
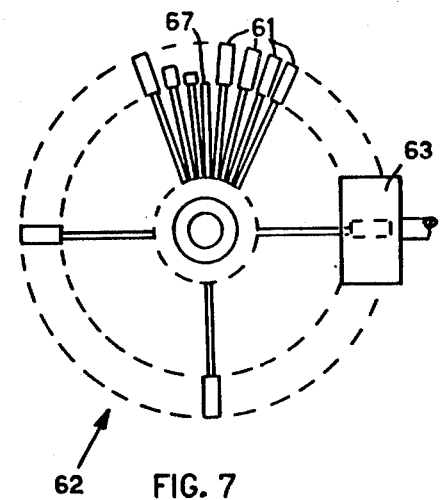
FIG. 7 is a schematic view of another printer according to the invention.
Figure 8:
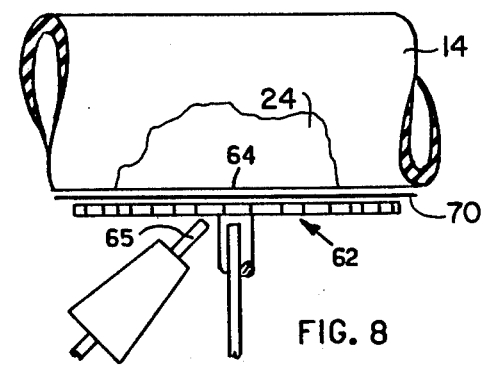
FIG. 8 shows an embodiment of the erasing means for the printer of FIG. 7.
Figure 9:
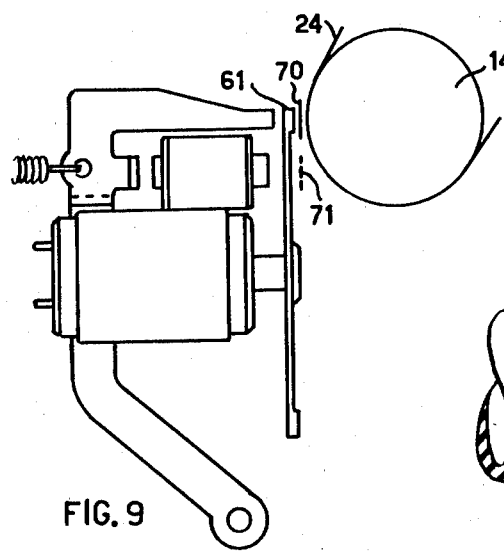
FIG. 9 is a schematic view of another printer according to the invention.

Other possible embodiments for erasably printing characters are schematically illustrated in FIGS. 7, 8 and 9.

FIG. 7 refers to a wheel printer of a known type, where the inking of the printing characters 61 of the printing wheel 62 is provided by an inking roller 63 impregnated with an ink according to the invention, containing sublimable coloring agents, where the aqueous vehicles are replaced by resins, waxes, oils, etc.

In FIG. 9 relative to an impact printer of known type, the inking roller 63 of FIG. 7 is substituted by a transfer ribbon 70, impregnated with the above mentioned ink containing easily sublimable coloring agents, interposed between a printing character 61 and the paper 24. The embodiments for erasably printing characters are valid for any type of impact printer, using wheel, ball or hammers.

The erasing embodiments of FIGS. 3, 4, 5 and 10 also apply to the embodiments for erasably printing characters of FIGS. 7 and 9. A more specific erasing embodiment suitable for the printers of FIGS. 7 and 9 is shown in FIG. 8, where a hot air stream is directed by a nozzle 65 directly onto the printing position 64, while the wheel 62 is positioned on the position 67 (FIG. 7) having no printing characters, causing the erasure of the printed characters. During the erasing operation, the transfer ribbon 70 is lowered to a rest position indicated in FIG. 9 as 71.

In another erasing embodiment the hot air stream emanating from the nozzle 17 of FIG. 2 is substituted by a hot point touching the paper and causing the sublimation of the coloring agents of the printed character by the same movements followed during the printing.

In another embodiment the printing point 11 of FIG. 1 is an ink jet printer nozzle ejecting droplets or mist or vapour of an ink according to the invention containing easily sublimable coloring agents.

What we claim is:

1. A method for correctably printing alphanumeric characters visible under ordinary light, comprising the steps of printing the characters with an ink containing sublimable coloring agents selected from the group consisting of anthraquinone, azo, azomethines, stilbenes, nitrodiarylamines, acridines, xanthones and diazines, and producing local concentrated heating only of the improperly printed characters to be erased and not of the properly printed characters by applying a stream of hot air over said characters to be erased, so that the erasure of said improperly printed characters is effected leaving said properly printed characters intact.

2. A method according to claim 1, wherein said coloring agents are associated with a binder selected from the group consisting of ethylcellulosic, ketonic, phenolic and acrylic resins.

3. A method according to claim 1 wherein said ink includes a water-base solvent comprising alcohols.

4. A method according to claim 1 wherein said ink includes at least one low sublimating temperature additive selected from the group consisting of lauric acid, camphor and naphthalene, to help the removal of the coloring agents in the sublimation phase.

5. A method for correctably printing alphanumeric characters visible under ordinary light, comprising the steps of printing the characters with an ink containing sublimable coloring agents selected from the group consisting of anthraquinone, azo, azomethines, stilbenes, nitrodiarylamines, acridines, xanthones and diazines, and producing local concentrated heating only of the improperly printed characters to be erased and not of the properly printed characters, by pressing against each improperly printed character to be erased a hot metallic element.

6. A method according to claim 5, wherein said hot metallic element has a surface sufficient to completely cover said improperly printed character.

7. A method for correctably printing alphanumeric characters visible under ordinary light, comprising the steps of printing the characters with an ink containing sublimable coloring agents selected from the group consisting of anthraquinone, azo, azomethines, stilbenes, nitrodiarylamines, acridines, xanthones and diazines, and producing local concentrated heating only of the improperly printed characters to be erased and not of the properly printed characters, by means of a lamp whose radiant energy is concentrated upon each improperly printed character to be erased.

8. An apparatus for correctably printing alphanumeric characters visible under ordinary light, comprising ink printing means for printing alphanumeric characters with an ink containing sublimable coloring agents selected from the group consisting of anthraquinone, azo, azomethines, stilbenes, nitrodiarylamines, acridines, xanthones and diazines, and erasing means associated with said printing means and operable for providing local concentrated heating only of the improperly printed characters to be erased, and not of the properly printed characters, including a pipe carrying hot air and a nozzle connected to said pipe.

9. An apparatus according to claim 8, wherein said ink printing means comprises a point writing element supplied with said ink, said element being conditioned to trace the characters to be printed by a combination of movements according to the X, Y and Z axes, and wherein said nozzle is movable according to the same X and Y movements as during the tracing of the characters, for applying said hot air following the trace of the improperly printed characters to be erased.

10. An apparatus according to claim 8, wherein said ink printing means comprises impact printing means conditionable to print through an ink ribbon, said ribbon being impregnated with an ink containing said sublimable coloring agents.

11. An apparatus according to claim 8 wherein said ink printing means comprises impact printing means inked by an inking roller, said roller being impregnated with an ink containing said sublimable coloring agents.

12. An apparatus according to claim 8, wherein said sublimable coloring agents are associated with a binder selected from the group consisting of ethylcellulosic ketonic, phenolic and acrylic resins.

13. An apparatus according to claim 8, in which said ink includes a water-base solvent comprising alcohols.

14. An apparatus according to claim 8, in which said ink includes at least one low sublimating temperature additive selected from the group consisting of lauric acid, camphor and naphthalene.

15. An apparatus for correctably printing characters visible under ordinary light, comprising ink printing means for printing alphanumeric characters with an ink containing sublimable coloring agents selected from the group consisting of anthraquinone, azo, azomethines, stilbenes, nitrodiarylamines, acridines, xanthones and diazines and erasing means associated with said printing means and operable for providing local concentration heating only of the improperly printed characters to be erased, and not of the properly printed characters, including a metallic element having a surface sufficient to completely cover each improperly printed character to be erased, means conditionable for heating said metallic element and means for pressing said metallic element against said improperly printed character.

16. An apparatus according to claim 15, wherein said ink printing means comprises impact printing means inked by an inkning roller, said roller being impregnated with an ink containing said sublimable coloring agents.

17. An apparatus for correctably printing characters visible under ordinary light, comprising a point writing element supplied with an ink containing sublimable coloring agents selected from the group consisting of anthraquinone, azo, azomethines, stilbenes, nitrodiarylamines, acridines, xanthones and diazines and conditioned to trace the characters to be printed by a combination of movements according to the X, Y and Z axes, and erasing means operable for providing local concentrated heating only of the improperly printed characters to be erased and not of the properly printed characters by means of a lamp whose radiant energy is concentrated upon each improperly printed character to be erased.

* * * * *

UNITED STATES PATENT AND TRADEMARK OFFICE
CERTIFICATE OF CORRECTION

PATENT NO. : 4,188,139
DATED : February 12, 1980
INVENTOR(S) : Arnaldo Pasini; Claudio Dalmasso; Riccardo Brescia, and Roberto Bosio It is certified that error appears in the above-identified patent and that said Letters Patent are hereby corrected as shown below:

At column 3, line 43, "biners" should read -- binders --.

At column 3, between lines 46 and 47, please insert -- The following four formulations demonstrate suitable sublimable ink compositions according to the present invention: --

Signed and Sealed this

Sixth Day of May 1980

[SEAL]

Attest:

SIDNEY A. DIAMOND

Attesting Officer

Commissioner of Patents and Trademarks